(12) United States Patent
Swan et al.

(10) Patent No.: US 9,500,130 B2
(45) Date of Patent: Nov. 22, 2016

(54) CENTERLINE SUPPORT BAR FOR STEAM TURBINE COMPONENT

(71) Applicant: General Electric Company, Schenectady, NY (US)

(72) Inventors: Stephen Roger Swan, Ballston Lake, NY (US); Matthew Edward Renninger, Schenectady, NY (US); Kevin John Lewis Roy, Clifton Park, NY (US); Prashant Prabhakar Sankolli, Karnataka (IN)

(73) Assignee: General Electric Company, Schenectady, NY (US)

( * ) Notice: Subject to any disclaimer, the term of this patent is extended or adjusted under 35 U.S.C. 154(b) by 815 days.

(21) Appl. No.: 13/785,869

(22) Filed: Mar. 5, 2013

(65) Prior Publication Data

US 2014/0250915 A1     Sep. 11, 2014

(51) Int. Cl.
*F01D 25/24* (2006.01)
*F02C 7/20* (2006.01)
*F01D 9/04* (2006.01)
*F01D 25/28* (2006.01)

(52) U.S. Cl.
CPC ............... *F02C 7/20* (2013.01); *F01D 9/042* (2013.01); *F01D 25/246* (2013.01); *F01D 25/28* (2013.01); *F05D 2220/31* (2013.01)

(58) Field of Classification Search
CPC .... F01D 25/246; F01D 25/28; F01D 25/243; F01D 25/26
See application file for complete search history.

(56) References Cited

U.S. PATENT DOCUMENTS

| | | | | |
|---|---|---|---|---|
| 1,352,278 A * | 9/1920 | Junggren | ............... | F01D 25/26 415/135 |
| 6,325,596 B1 * | 12/2001 | Tomko | .................. | F01D 25/246 415/209.2 |
| 6,352,405 B1 * | 3/2002 | Tomko | .................. | F01D 25/265 415/209.2 |
| 8,529,198 B2 * | 9/2013 | Burdgick | ............... | F01D 9/047 415/126 |
| 8,690,533 B2 * | 4/2014 | Burdgick | ............. | F01D 25/243 415/213.1 |
| 8,834,113 B2 * | 9/2014 | Schaus | .................... | F01D 9/041 415/209.2 |
| 8,905,712 B2 * | 12/2014 | Burdgick | ............. | F01D 25/246 415/213.1 |
| 2011/0250063 A1 * | 10/2011 | Burdgick | ............. | F01D 25/246 415/209.2 |

* cited by examiner

*Primary Examiner* — Craig Kim
*Assistant Examiner* — Brian O Peters
(74) *Attorney, Agent, or Firm* — Ernest G. Cusick; Hoffman Warnick LLC

(57) ABSTRACT

A centerline support bar for steam turbine component assembly, installation, and/or alignment is disclosed. In one embodiment, the support bar includes a body portion configured to be disposed across a centerline of a steam turbine, the body portion configured to transversely connect to a steam turbine component; and a first flange extending from the body portion and configured to contact a steam turbine casing, wherein the steam turbine support bar is configured to non-affixedly join the steam turbine casing to the steam turbine component.

19 Claims, 13 Drawing Sheets

CENTERLINE SUPPORT BAR FOR STEAM TURBINE COMPONENT

BACKGROUND OF THE INVENTION

The subject matter disclosed herein relates to steam turbine assembly and alignment. Specifically, the subject matter disclosed herein relates to a centerline support bar for non-affixedly connecting a steam turbine component (e.g., a diaphragm, a static nozzle assembly, etc.) and a steam turbine casing.

Steam turbines include turbine components (e.g., static nozzle assemblies) that direct flow of a working fluid into turbine buckets connected to a rotating rotor. The nozzle construction (including a plurality of nozzles, or "airfoils") is sometimes referred to as a "diaphragm" or "nozzle assembly stage." Steam turbine diaphragms include two halves, which are assembled about the rotor, creating horizontal joints between these two halves. Each turbine diaphragm stage is vertically supported by support bars, support lugs or support screws on each side of the diaphragm at the respective horizontal joints which also correspond to horizontal joints of the turbine casing. These support bars are typically attached horizontally to the bottom half of the diaphragm stage near the horizontal joints.

The typical support bar includes a tongue portion that fits into a pocket which is machined into the diaphragm. This support bar also includes an elongated portion which sits on a ledge of the turbine casing. Performing diaphragm maintenance may require accessing the bottom half of the diaphragm, which is incapable of rotating about the turbine rotor due to the support bars and a centering pin coupling the bottom half of diaphragm to the casing. Additionally, removal of the bottom half of the diaphragm may also be necessary in order to align the bottom half with the horizontal joint of the casing. In order to access the bottom half of the diaphragm, a number of time-consuming and costly steps would be required, such as upper half hardware removal and rotor removal.

BRIEF DESCRIPTION OF THE INVENTION

A steam turbine nozzle support bar is disclosed. In one embodiment, the steam turbine support bar includes a body portion configured to be disposed across a centerline of a steam turbine, the body portion configured to transversely connect to a steam turbine component; and a first flange extending from the body portion and configured to contact a steam turbine casing, wherein the steam turbine support bar is configured to non-affixedly join the steam turbine casing to the steam turbine component.

A first aspect of the invention includes a steam turbine support bar including a body portion configured to be disposed across a centerline of a steam turbine, the body portion configured to transversely connect to a steam turbine component; and a first flange extending from the body portion and configured to contact a steam turbine casing, wherein the steam turbine support bar is configured to non-affixedly join the steam turbine casing to the steam turbine component.

A second aspect of the invention includes a steam turbine nozzle support assembly including: a steam turbine casing; a semi-annular diaphragm segment at least partially housed within the steam turbine casing; and a steam turbine support bar disposed between the steam turbine casing and the semi-annular diaphragm segment, the steam turbine support bar connected to the semi-annular diaphragm segment and including: a body portion configured to be disposed across a centerline of a steam turbine, the body portion configured to transversely connect to the semi-annular diaphragm segment; and a first flange extending from the body portion and configured to contact the steam turbine casing, wherein the steam turbine support bar is configured to non-affixedly join the steam turbine casing to the steam turbine component.

A third aspect of the invention includes a steam turbine apparatus comprising: a casing having a horizontal joint surface; a rotor within the casing; and a steam turbine nozzle support assembly including: a semi-annular diaphragm segment at least partially housed within the casing; and a support bar connected to the semi-annular diaphragm segment and in contact with the casing, the support bar including: a body portion configured to be disposed across a centerline of a steam turbine, the body portion configured to transversely connect to the semi-annular diaphragm segment beneath the centerline; and a first flange extending from the body portion and configured to contact the horizontal joint surface, wherein the steam turbine support bar is configured to non-affixedly join the steam turbine casing to the steam turbine component.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. It is understood that elements similarly numbered between the FIGURES may be substantially similar as described with reference to one another. Further, in embodiments shown and described with reference to FIGS. 1-14, like numbering may represent like elements. Redundant explanation of these elements has been omitted for clarity. Finally, it is understood that the components of FIGS. 1-14 and their accompanying descriptions may be applied to any embodiment described herein.

DETAILED DESCRIPTION OF THE INVENTION

Aspects of the invention provide for a centerline support bar for a steam turbine nozzle assembly. This support bar may be connected to a turbine component and may allow for alignment, shim adjustment, removal and/or repair of components of the steam turbine nozzle assembly, without the need to remove the steam turbine rotor and/or an upper half of the suspended component. The support bar may connect (e.g., bolt) to a turbine component and include a flange which extends from a body portion of the support bar to engage with an upper surface of a steam turbine casing. During assembly, installation, and/or alignment, the support bar may be transversely installed (e.g., at substantially right angle relative to the rotor) between the turbine component (e.g., diaphragm, packing holder, etc.) and the casing. In an embodiment, a body portion of the support bar is connected/affixed to the turbine component beneath a centerline of the steam turbine, and a first flange of the support bar operably engages the casing substantially above a centerline of the steam turbine. A technician may adjust shims between the casing and the support bar to assist in system alignment and/or centerline support. As this support bar may be installed transversely, system versatility may be improved as centerline support may be provided in locations of the turbine system where axial installation/assembly is not available.

Figure 1:
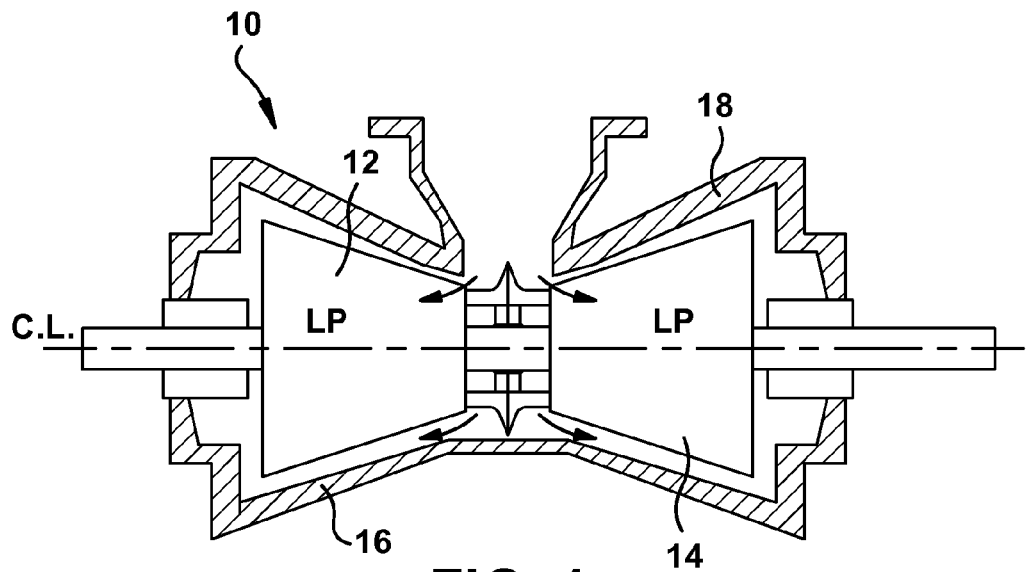
FIG. 1 shows a partial cross-sectional schematic of a double-flow steam turbine according to the prior art.
Figure 2:
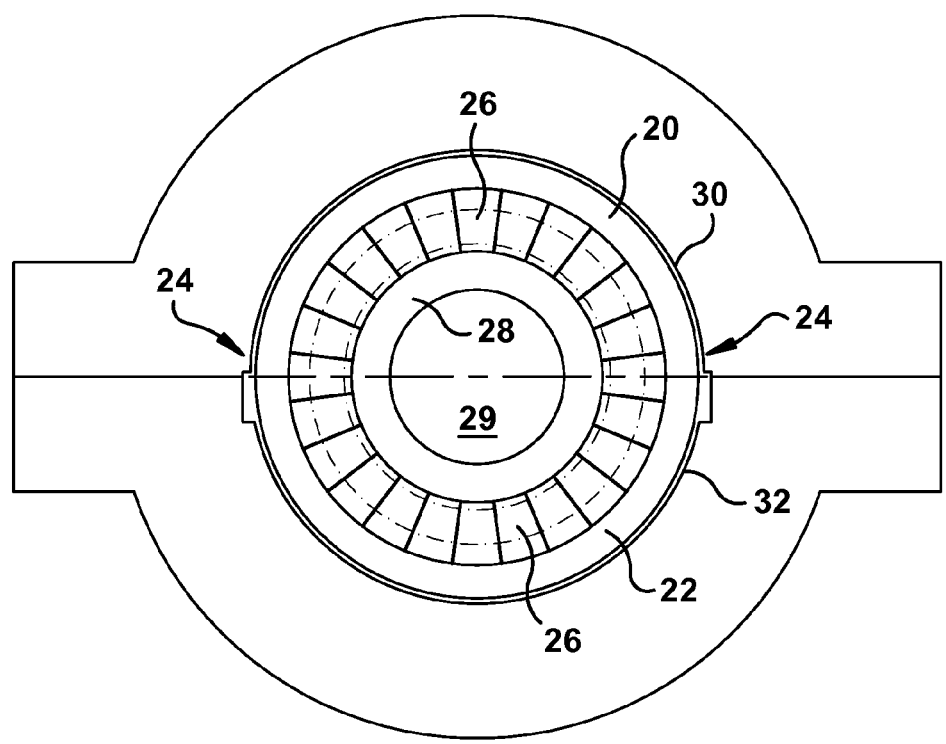
FIG. 2 shows a general schematic end elevation of a pair of annular diaphragm ring segments joined at a horizontal split surface according to the prior art.

Turning to FIG. 1, a partial cross-sectional schematic of a double-flow steam turbine 10 (e.g., a low-pressure steam turbine) according to the prior art is shown. Double-flow steam turbine 10 may include a first low-pressure (LP) section 12 and a second LP section 14, surrounded by first and second diaphragm assemblies 16, 18, respectively (including casing sections and diaphragm ring segments housed therein). As shown in FIG. 2, each diaphragm assembly 16, 18 includes a pair of semi-annular diaphragm ring segments 20, 22, which are joined at a horizontal joint surface 24. Diaphragm ring segments 20, 22 are housed within casing segments 30, 32, respectively, which are also joined at horizontal joint surface 24. Each semi-annular diaphragm ring segment 20, 22, supports a semi-annular row of turbine nozzles 26 and an inner web 28, as is known in the art. The diaphragm ring segments 20, 22 collectively surround a rotor 29, as is known in the art.

Figure 3:
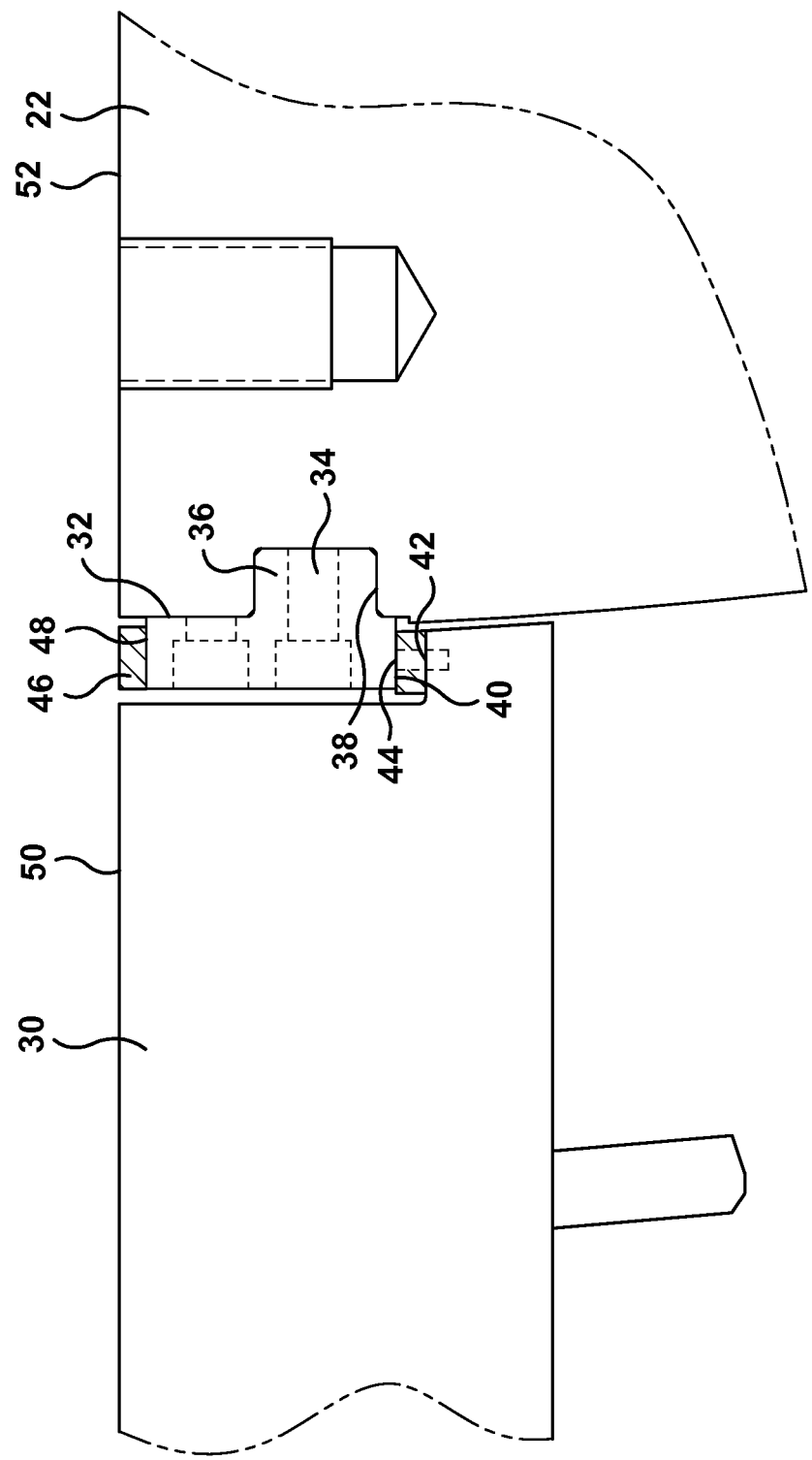
FIG. 3 shows a partial end elevation of a steam turbine nozzle support assembly according to the prior art.

Turning to FIG. 3, a prior art support assembly for a steam turbine diaphragm is shown. Specifically, FIG. 3 is a close-up view of a portion of the lower semi-annular diaphragm ring segment (or simply, lower diaphragm segment) 22 of FIG. 2, which is affixedly coupled to a lower turbine casing half (or simply, casing) 30. Lower diaphragm segment 22 is shown to be vertically supported within casing 30 by a support bar 32, as is known in the art. Support bar 32 is bolted to lower diaphragm segment 22 by bolt(s) 34 extending through support bar 32. At least one bolt 34 may extend through a radially inwardly directed flange 36 of support bar 32. Flange 36 is received in a mating slot 38 in lower diaphragm segment 22. Support bar 32 otherwise extends vertically along casing 30 on one side and diaphragm segment 22 on the other side. A lower surface 40 of the support bar faces a shoulder 42 formed in casing 30, with a shim block (or simply, shim) 44 interposed between shoulder 42 and lower surface 40. Shim 44 is typically bolted to casing 30. A second shim block 46 is shown seated on an upper surface 48 of support bar 32 to effectively make the upper end of support bar flush with horizontal joint surfaces 50, 52 of casing 30 and lower diaphragm segment 22, respectively. This arrangement allows support bar 32 to be sandwiched between the upper and lower casing sections (upper casing omitted). The other side of lower diaphragm segment 22 is similarly supported on the opposite side of the casing (other side omitted for clarity).

Performing vertical diaphragm alignment (alignment of horizontal joint surfaces 50, 52) or performing maintenance on diaphragm segment 22 (and components included therein) requires removal of the upper half of the casing, along with upper diaphragm segment 20 (FIG. 2). Further, because support bar 32 couples lower diaphragm segment 22 to casing 30, and due to the presence of a centering pin (not shown) coupling the diaphragm to the casing, lower diaphragm segment 22 cannot be rotated around rotor 29 (FIG. 2) while housed within casing 30 (due to a lack of clearance). Due to this limited clearance, the positioning of bolts 34 in support bars 32, and the presence of the centering pin, the lower diaphragm segment 22 must be removed vertically from casing 30 in order to access support bars 32. This requires removing rotor 29, and subsequently lifting lower diaphragm segment 22 vertically in order to remove bolts 34. This process is both time consuming and costly.

Figure 4:
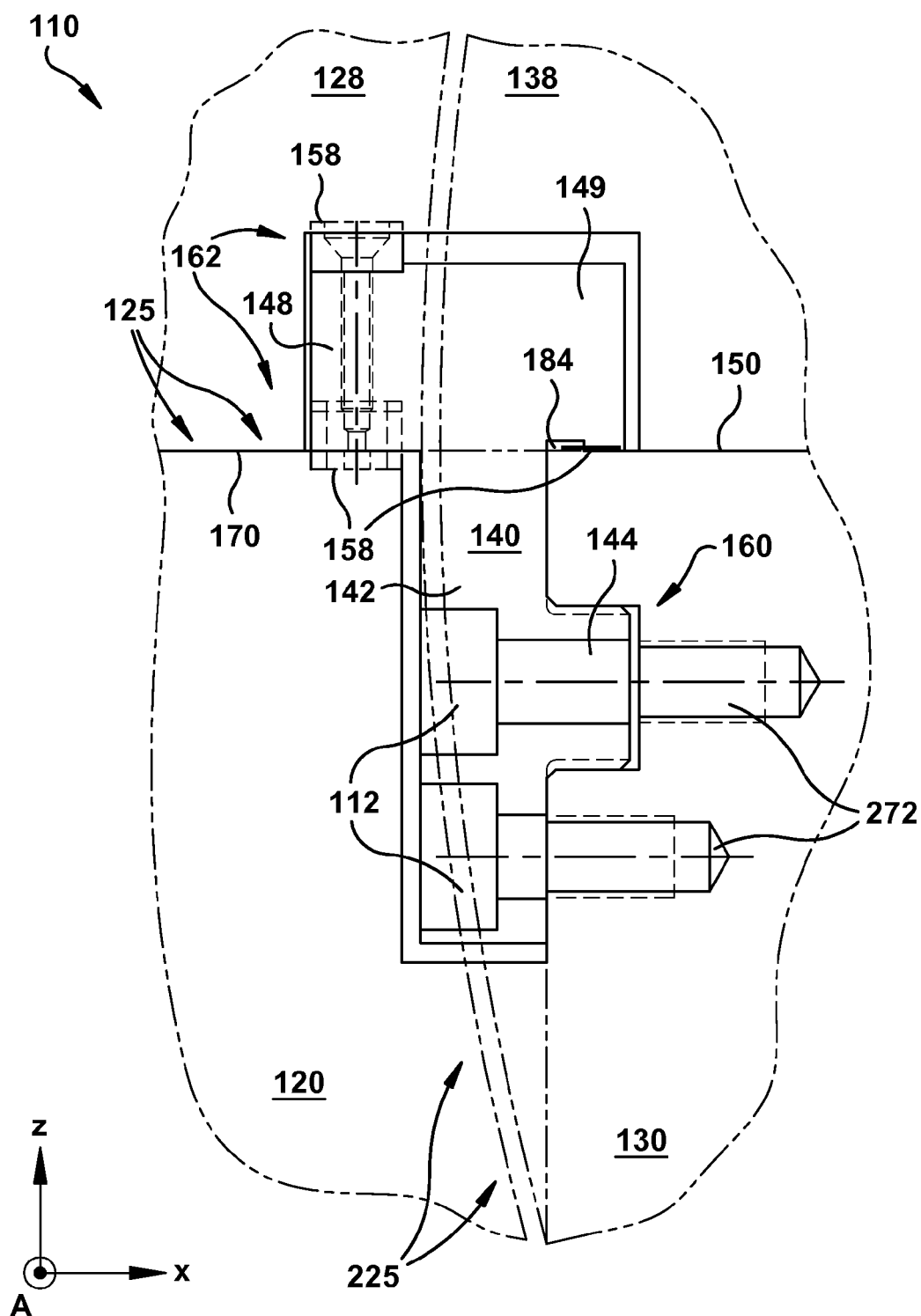
FIGS. 4-12 show perspective views of steam turbine nozzle support assemblies according to embodiments of the invention.
Figure 5:
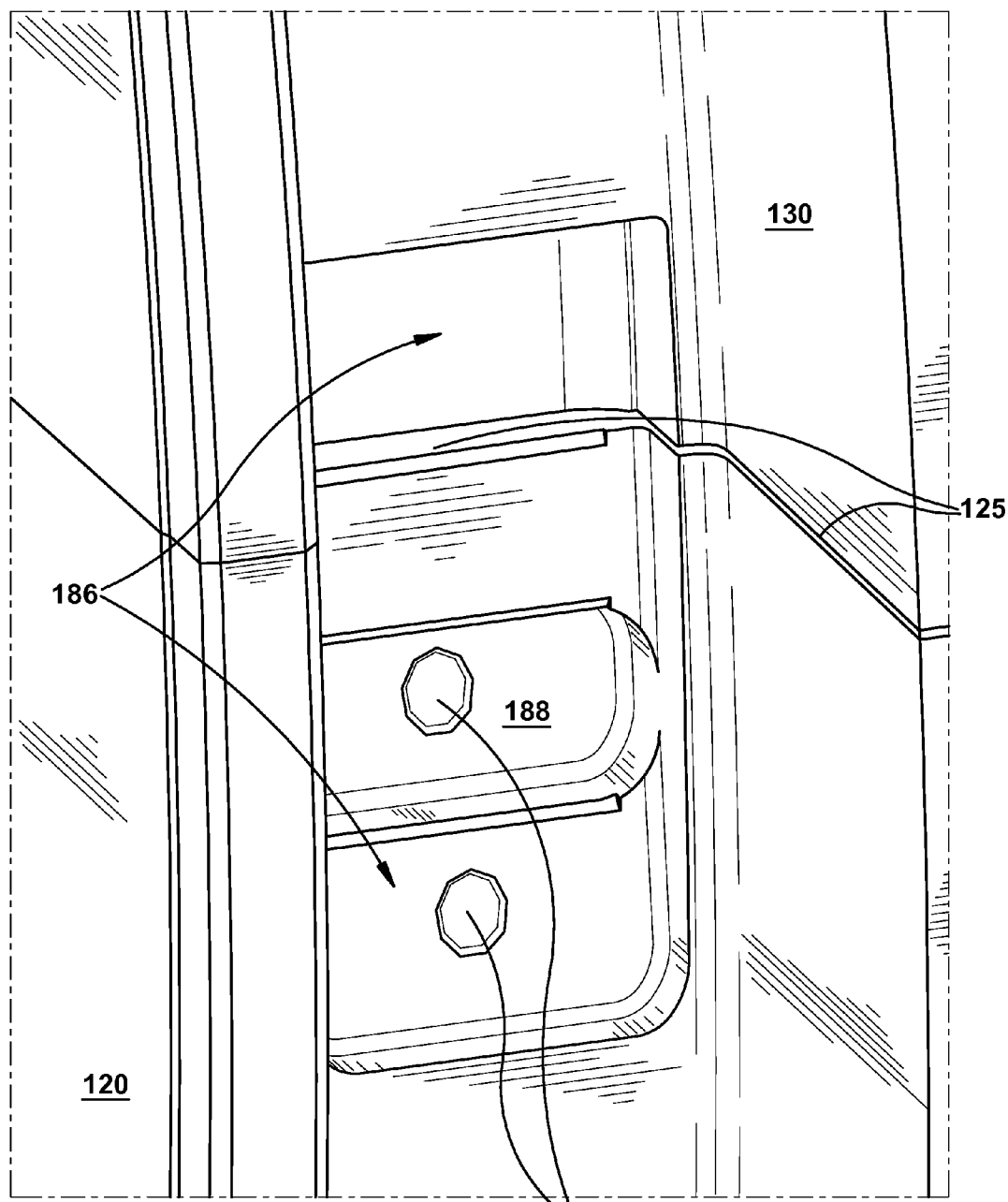

Turning to FIG. 4, a steam turbine nozzle support assembly 110 is shown according to an embodiment of the invention. As used herein, the directional key in the lower left-hand portion of FIGS. 4-12 is provided for ease of reference. As shown, this key is oriented with respect to the close-up views of portions of steam turbine support assemblies described herein. For example, as used in FIGS. 4-12, which show front views of steam turbine support assemblies, the "z" axis represents vertical (or radial) orientation, "x" represents horizontal/transverse (or radial) orientation, and the "A" axis (into and out of the page) represents axial orientation (along the axis of the turbine rotor, omitted for clarity).

In an embodiment, steam turbine nozzle support assembly 110 includes a steam turbine casing half (or simply, casing) 120 and a turbine component (e.g., a semi-annular diaphragm segment) 130 at least partially housed within casing 120. Also shown in FIG. 4 is a support bar 140 which may connect to turbine component 130. In one embodiment, support bar 140 may be connected to turbine component 130 via a set of connectors 272 (e.g., bolts, screws, etc.) disposed in a set of apertures 112 defined in support bar 140. For illustrative purposes, an upper steam turbine casing half (or simply, upper casing) 128 and an upper component portion (e.g., semi-annular diaphragm segment) 138 are also shown. As described further herein, in some embodiments, upper casing 128 and/or upper component portion 138 may be formed with a slot to receive an upper flange (e.g., first flange 148) of a support bar (e.g., support bar 140). First flange 148 may extend substantially perpendicularly from body portion 142 and radially outward over an upper surface 170 of casing 120. As described further herein, in contrast to support bar 32 of the prior art (FIG. 3), in one embodiment, support bar 140 is configured to join casing 120 to turbine component 130 along a centerline 125 (e.g., a seating surface suitable to reduce and/or minimize differential thermal expansion) of a turbine. In other words, the configuration of support bar 140 including first flange 148 allows it to be adjusted (e.g., shimmed, manipulated, accessed, etc.) between steam turbine casing 120, turbine component 130, upper casing 128, and/or upper component portion 138 such that support bar 140 is not affixed to either of casing 120, upper casing 128, and/or upper semi-annular diaphragm segment 138 (e.g., by bolts, screws, adhesive, or other fixation mechanisms). However, despite not being affixed to either of upper steam turbine diaphragm 138, steam turbine casing 120, and/or upper steam turbine casing 128, support bar 140 is configured to at least partially join/position/orient steam turbine diaphragm 130, upper steam turbine diaphragm 138, steam turbine casing 120, and/or upper steam turbine casing 128 relative to one another.

As indicated above, support bar 140 may include a set of apertures 112 configured to matingly receive set of connectors 272. In an embodiment, set of apertures 112 may include a set of countersinks so as to reduce (e.g., produce a zero-profile) protrusion of connectors 272 into an interface 225 between casing 120 and turbine component 130. In one embodiment, set of apertures 112 may be disposed beneath centerline 125.

In one embodiment, a hook-shaped portion 184 may be disposed on first flange 148 and may include any arced, angled, or curved portion of support bar 140 capable of non-affixedly engaging turbine component 130. As is described further herein, in one embodiment, hook-shaped portion 184 may include portions of one or more flanges, bosses, or protrusions.

With continuing reference to FIG. 4, turbine component 130 includes a horizontal joint surface 150 and a slot 160 extending substantially parallel to horizontal joint surface 150. As shown, portions (including e.g., a third flange 144) of support bar 140 may substantially complement slot 160. For example, as shown in FIG. 4, support bar 140 may include a body portion 142, third flange (or boss) 144 extending substantially perpendicularly from body portion 142, and a first flange (or boss) 148 extending substantially perpendicularly from body portion 142. Third flange 144 may partially define an aperture 112 (shown in phantom). It is understood that as used herein, the term "complementary" refers to a relationship between surfaces in which portions of those surfaces may be arranged substantially aligned with one another. For example, in one embodiment, surfaces of third flange 144 may be arranged substantially aligned with a wall of slot 160. Further, surfaces of first flange 148 may be arranged substantially aligned with a wall of a slot 162 in casing 120 and/or casing 128.

As is further shown in FIG. 4, in one embodiment, support bar 140 may include a second flange (or simply, a portion of first flange 148) 149 extending substantially perpendicularly from body portion 142 and radially inwardly over an upper surface 150 of component portion 130. As will be described further herein, first flange 148 may allow for e.g., an operator, technician and/or maintenance personnel to adjust the position of horizontal joint surface 150 relative to upper surface 170. That is, adjustment of the position of first flange 148 may allow for alignment of horizontal joint surface 150 and upper surface 170. This may be performed, for example, by inserting a shim 158 between upper surface 170 and first flange 148 to separate first flange 148 from upper surface 170. In the case where incremental adjustment of the position of first flange 148 is desirable, shim 158 may be accessed (and, e.g., later machined) without removing turbine component 130 and rotor (e.g., rotor 29 of FIG. 2). As noted above, first flange 148 may function as an overhanging support mechanism for support bar 140, and may allow for alignment of horizontal joint surface 150 and upper surface 170. Further shown in this embodiment is an additional shim 158, which may be placed between an upper surface of first flange 148, and a lower surface of upper casing half 128 (shown partially in phantom). This additional shim 158 may further aid in keeping support bar 140 in its proper position during operation of a steam turbine including steam turbine nozzle assembly 110.

As shown in phantom in FIG. 4, a set of connectors (e.g., bolts, screws, etc.) 272 may affix one or more portions of support bar 140 to turbine component 130. In an embodiment, body portion 142 may be connected to turbine component 130 beneath centerline 125 and first flange 148 may be disposed substantially above centerline 125. In an embodiment, shown in FIG. 5, casing 120 and/or turbine component 130 may define a support bar slot 186 oriented transversely and shaped to complement/matingly connect to support bar 140 in accordance with embodiments. Support bar slot 186 may be shaped slightly larger than support bar 140 such that portions of body portion 142, second flange 149 and third flange 144 may extend within casing 120 and/or turbine component 130. In one embodiment, support bar slot 186 may include a third flange slot 188 and a set of connector apertures 189 shaped to connect to set of connectors 272 and retain support bar 140.

Figure 6:
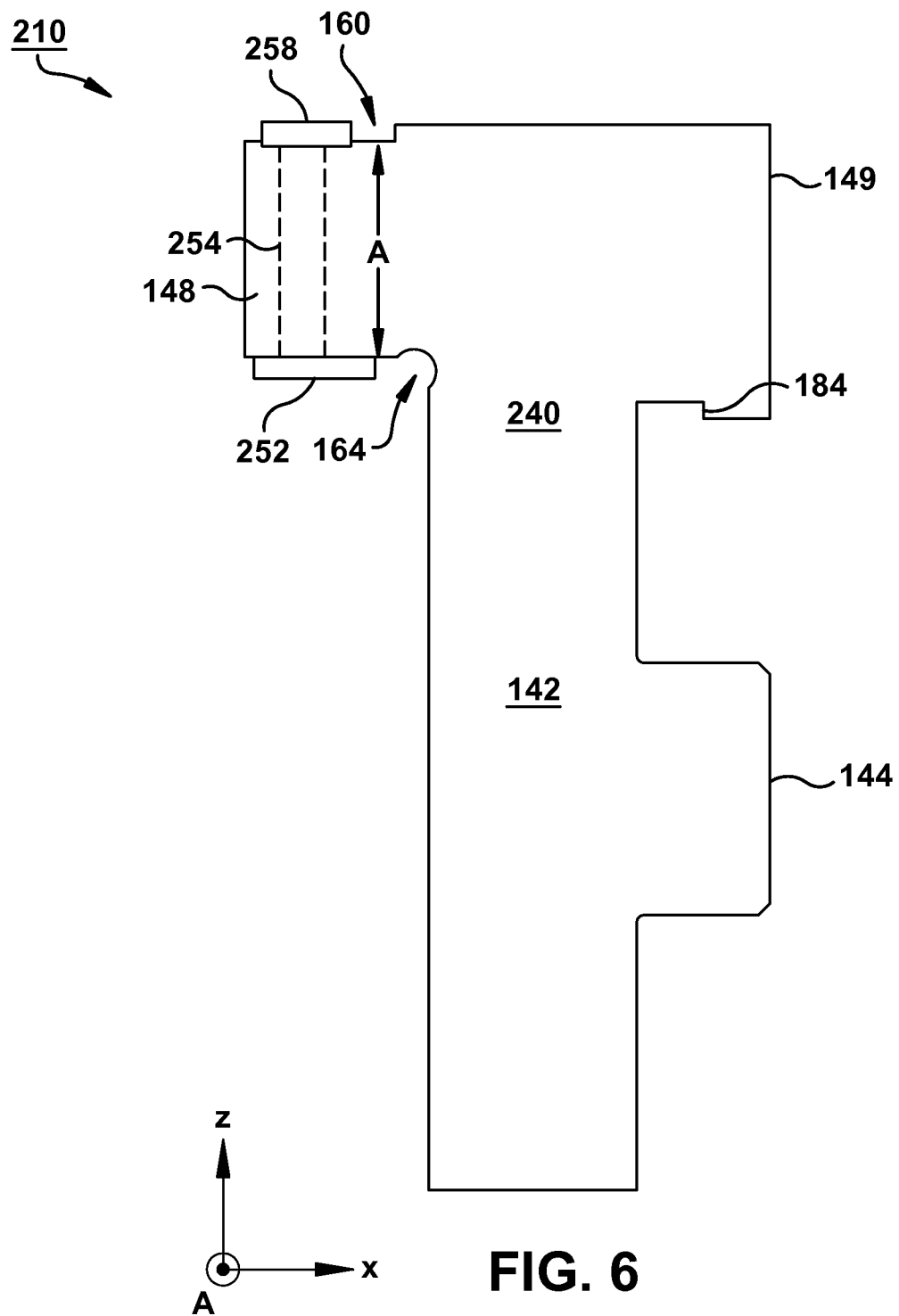

Turning to FIG. 6, an embodiment of a steam turbine nozzle assembly 210 is shown including a support bar 240. Support bar 240 may include a body portion 142 and a first flange 148 similar to that of support bar 140 (shown in FIG. 4). Similarly to support bar 140 (FIG. 4), body portion 142 may be configured to complement and/or connect to a turbine component 130. First flange 148, as shown in FIG. 6, has a thickness 'A' which is substantially complementary to a width of a slot/notch 158 in turbine casing 120. In this embodiment, alignment of horizontal joint surface 150 and upper surface 170 may be performed using a first shim 252 and at least one bolt 254 (shown in phantom) securing a position of first shim 252 relative to casing 120. First shim 252 and bolt 254 may be substantially similar to those shown and described with reference to FIG. 3, and in conjunction with a second shim 258, may allow for alignment of support bar 240 within slot 162, and consequently, alignment of horizontal joint surface 150 and upper surface 170. Returning to FIG. 6, as indicated, this steam turbine nozzle assembly 210 may further include second shim 258 above support bar 240. Second shim 258 may be bolted or otherwise affixed or retained non-affixedly to support bar 240 (e.g., using bolt 136). Support bar 240 of steam turbine nozzle assembly 210 may be connected to turbine component 130 in a transverse direction beneath centerline 125. As support bar 240 is transversely connected to turbine component 130, support bar 240 may be removed transversely from steam turbine nozzle assembly 210. In one embodiment, support bar 240 may include a fillet 164 disposed between body portion 142 and first flange 148. In an embodiment, a second flange 149 may include a hook portion 184 configured to matingly engage with a portion of turbine component 130.

Figure 7:
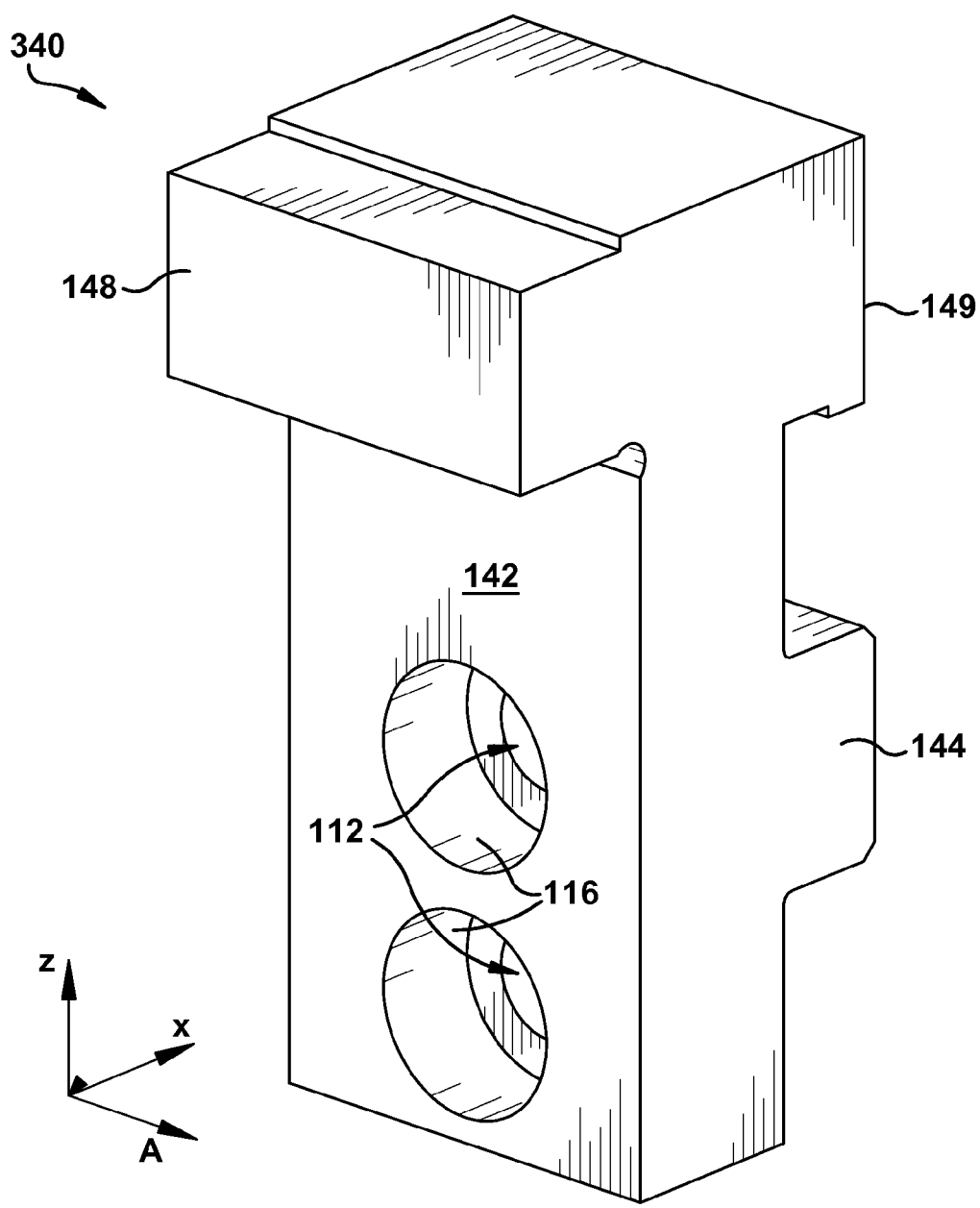
Figure 8:
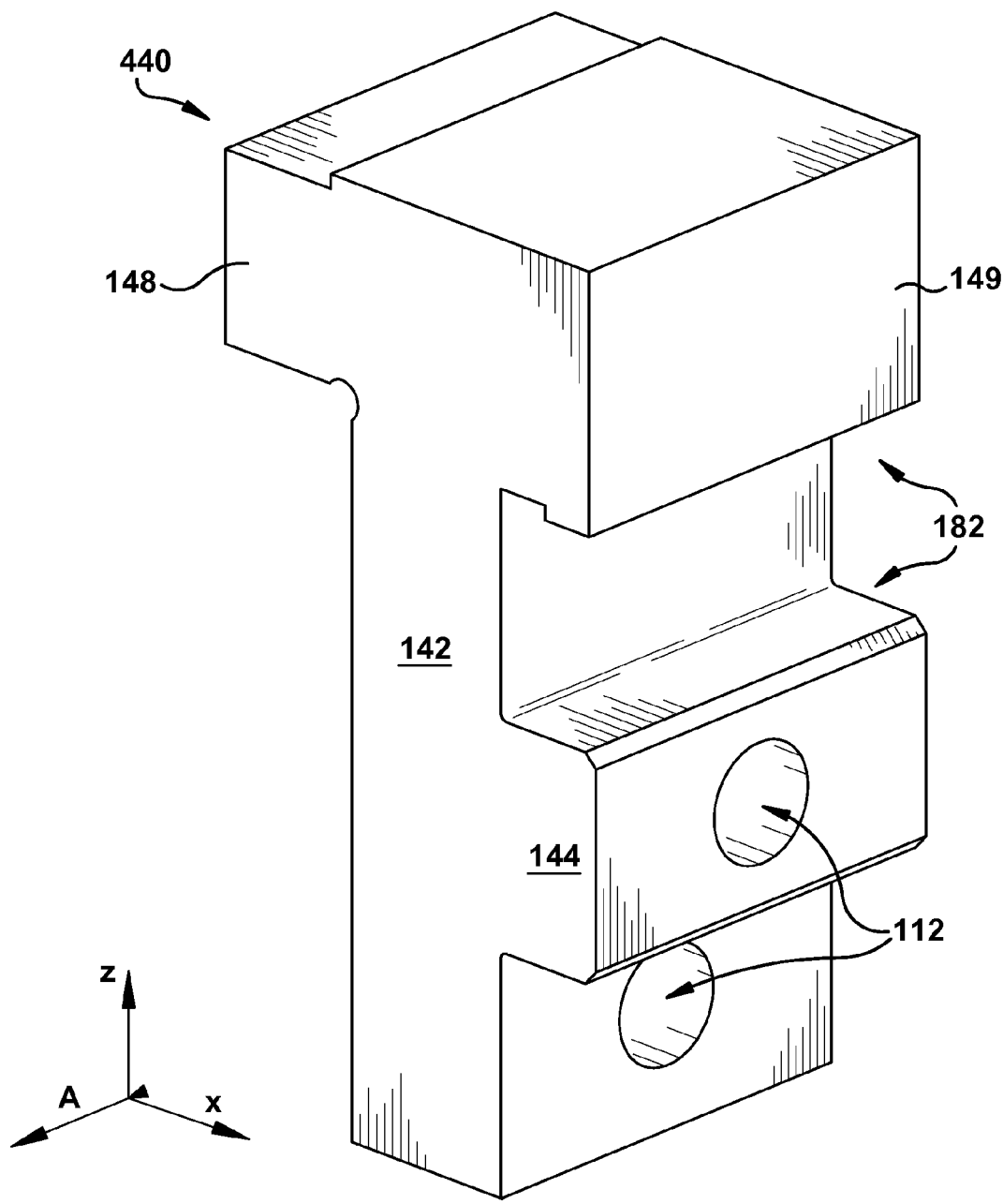

Turning to FIG. 7, a support bar 340 is shown according to another embodiment. This embodiment includes a support bar 340, which, similarly to support bar 140 (FIG. 4), may include a body portion 142 and a set of apertures 112. In an embodiment, set of apertures 112 include a set of countersinks 116 configured to matingly receive heads from set of connectors 172 (shown in FIG. 4). Depictions of support bars herein are merely illustrative and it is understood that while support bar 340 is shown defining two apertures 112, any number, arrangement, and/or orientation of apertures and/or connectors may be used in accordance with this invention. In another embodiment, shown in FIG. 8, a support bar 440 is shown defining a notch 182. This embodiment may combine features shown and described with reference to previously-discussed figures, and more specifically, support bar 440 may include a third flange 144 which partially defines notch 182 configured to complement a component flange 138 (shown in FIG. 9) of turbine component 130. In an embodiment, set of apertures 112 may extend through support bar 440, thereby enabling connectors 172 to contact/connect/penetrate turbine component 130.

Figure 9:
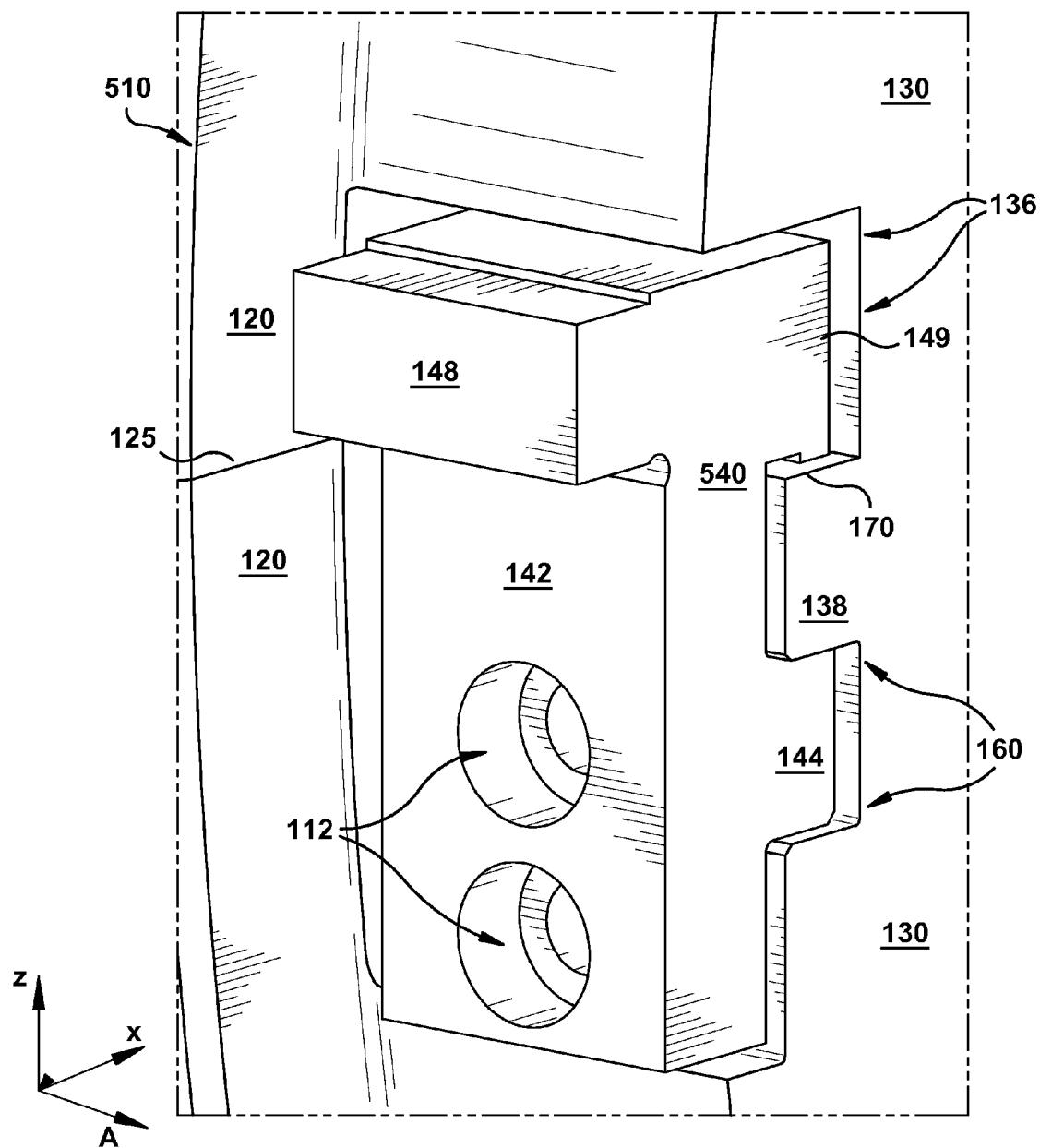
Figure 10:
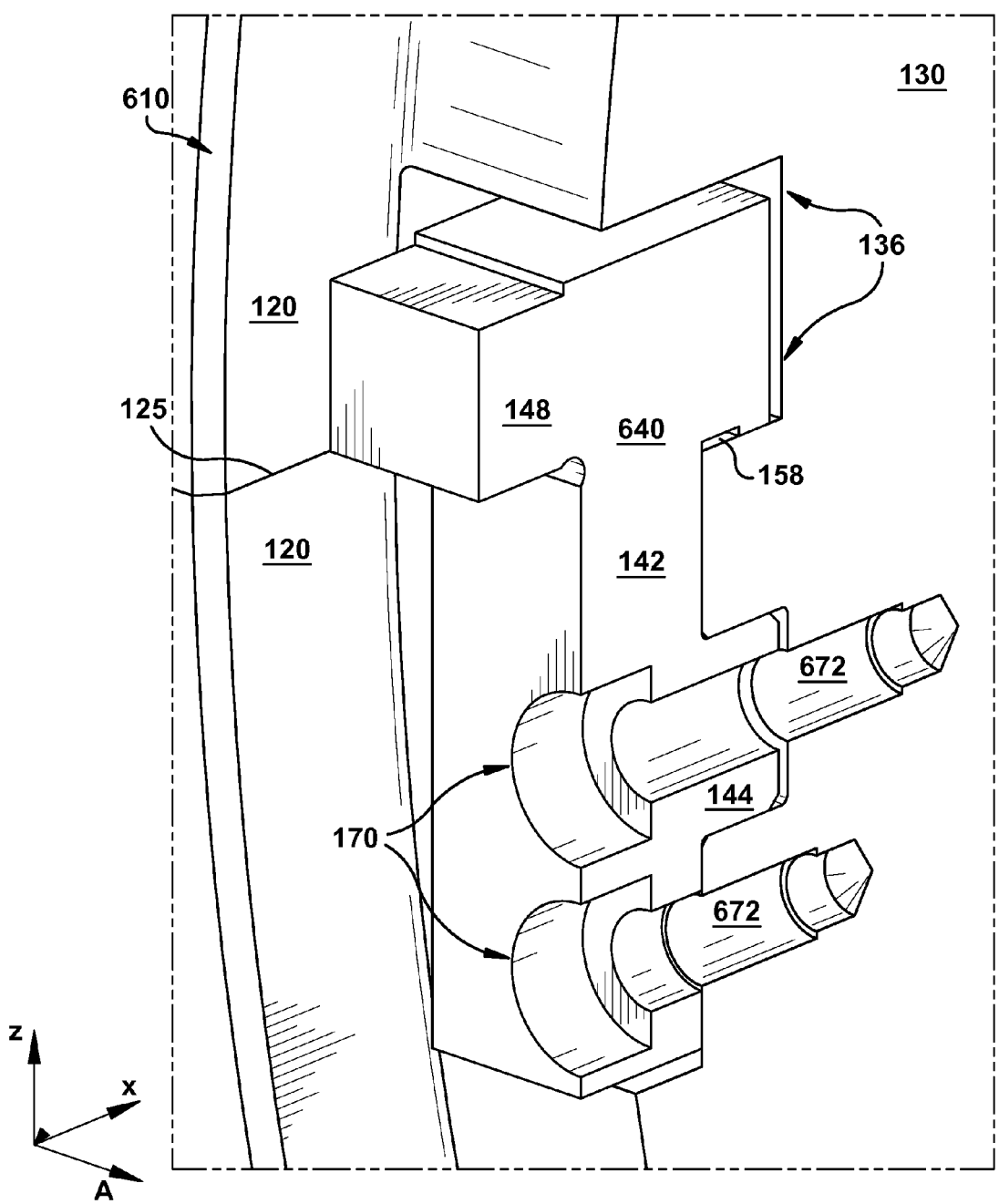

Turning to FIG. 9, a steam turbine nozzle assembly 510 is shown according to another embodiment. This embodiment may include features shown and described with reference to FIG. 4, as well as additional features. For example, steam turbine nozzle assembly 510 may include a support bar 540, which, similarly to support bar 140 (FIG. 4), may connect to turbine component 130 beneath centerline 125. In this embodiment, first flange 148 may be configured to contact casing 120, and may include second flange 149 which extends into a slot 136 of component 130. Second flange 149 may be configured to contact surface of turbine component 130. In an embodiment, second flange 149 may be designed at a minimal clearance relative slot 136 of turbine component 130 so as to adjust an orientation/relation between support bar 540, turbine component 130, and/or casing 120. Third flange 144 may connect with slot 160 which is partially defined by component flange 138. At least one of set of apertures 112 may be partially defined by third flange 144 and may extend through slot 160. In this embodiment, as with steam turbine nozzle assemblies 110 shown and described with reference to FIG. 4, support bar 540 is connected to turbine component 130 in a transverse direction (x). In another embodiment, shown in FIG. 10, a cross-sectional view of a steam turbine nozzle assembly 610 is shown including a support bar 640 and a set of connector slots 672. In an embodiment, set of connectors may extend within turbine component 130 to connect/affix/secure support bar 640 and/or body portion 142 to turbine component 130.

Figure 11:
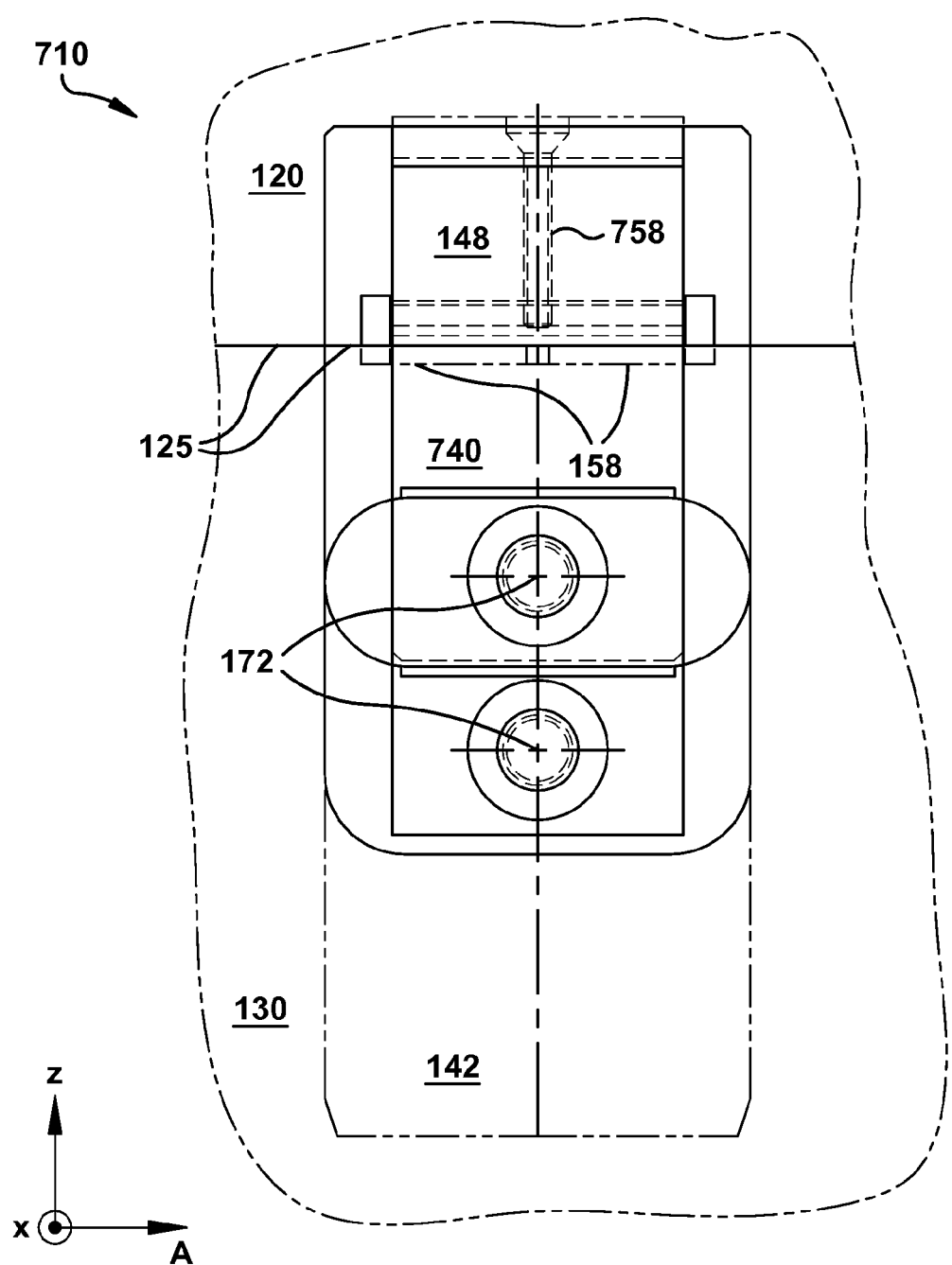

Turning to FIG. 11, an assembly view of a steam turbine nozzle assembly 710 is shown including a support bar 740 according to another embodiment. This embodiment may include features shown and described with reference to FIG. 4, as well as additional features. In this embodiment, body portion 142 is connected to turbine component 130 via a set of connectors 172. A set of shims 158 are disposed between first flange 148 and casing 120. In an embodiment, a screw 758 is disposed within first flange 148 and may be configured to secure a position of set of shims 158 relative casing 120 and/or first flange 148. In one embodiment, set of shims 158 may be self-retaining about first flange 148 (e.g., c-shaped shims). First flange 148 is disposed substantially above centerline 125 and body portion 142 is connected to turbine component 130 beneath centerline 125.

Figure 12:
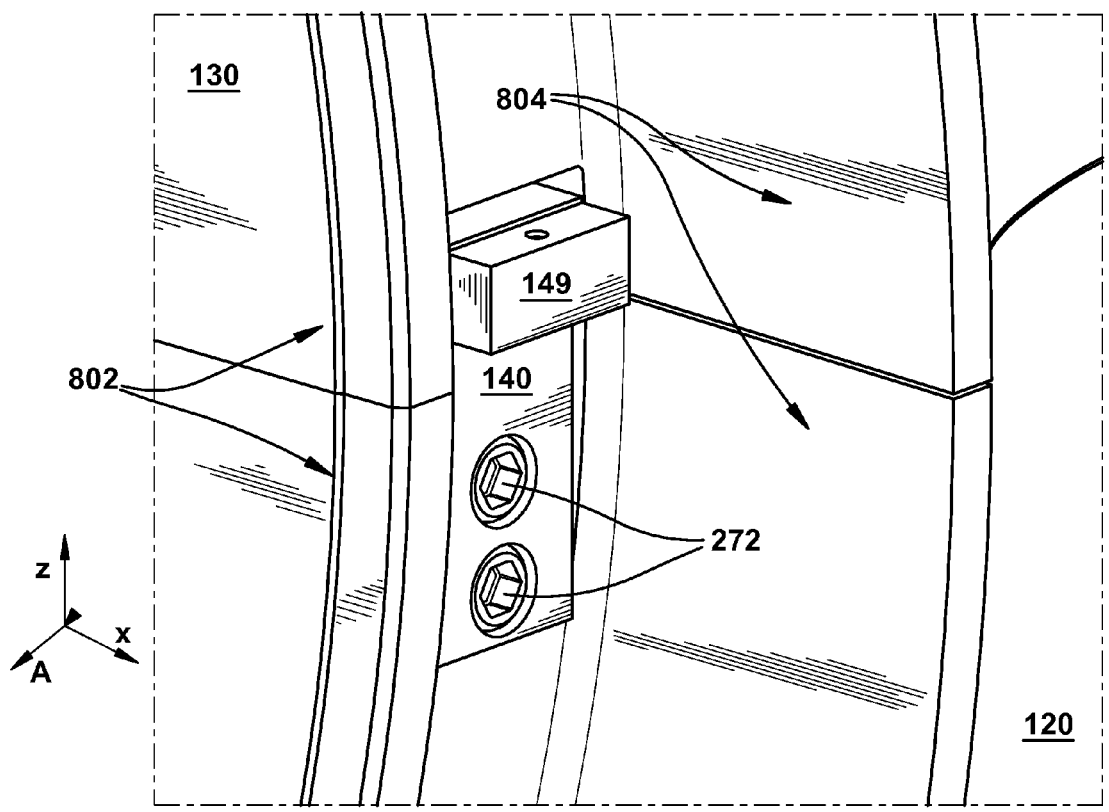

Turning to FIG. 12, an assembly view of support bar 140 transversely installed within a steam turbine including casing 120 and turbine component 130 is shown according to embodiments. In this embodiment, support bar 140 is disposed between a first fit 802 and a second fit 804 of casing 120 and turbine component 130. As can be seen in FIG. 12, the location of support bar 140 between first fit 802 and second fit 804 precludes axial installation and thus requires transverse installation. During installation, support bar 140 (e.g., including first flange 142 and third flange 144) may be inserted into support bar slot 186 in a transverse direction with second flange 149 protruding transversely outwards. In one embodiment, a set of connectors 272 may extend transversely through support bar 140 to connect to casing 120 and/or turbine component 130 and secure support bar 140 thereto.

Figure 13:
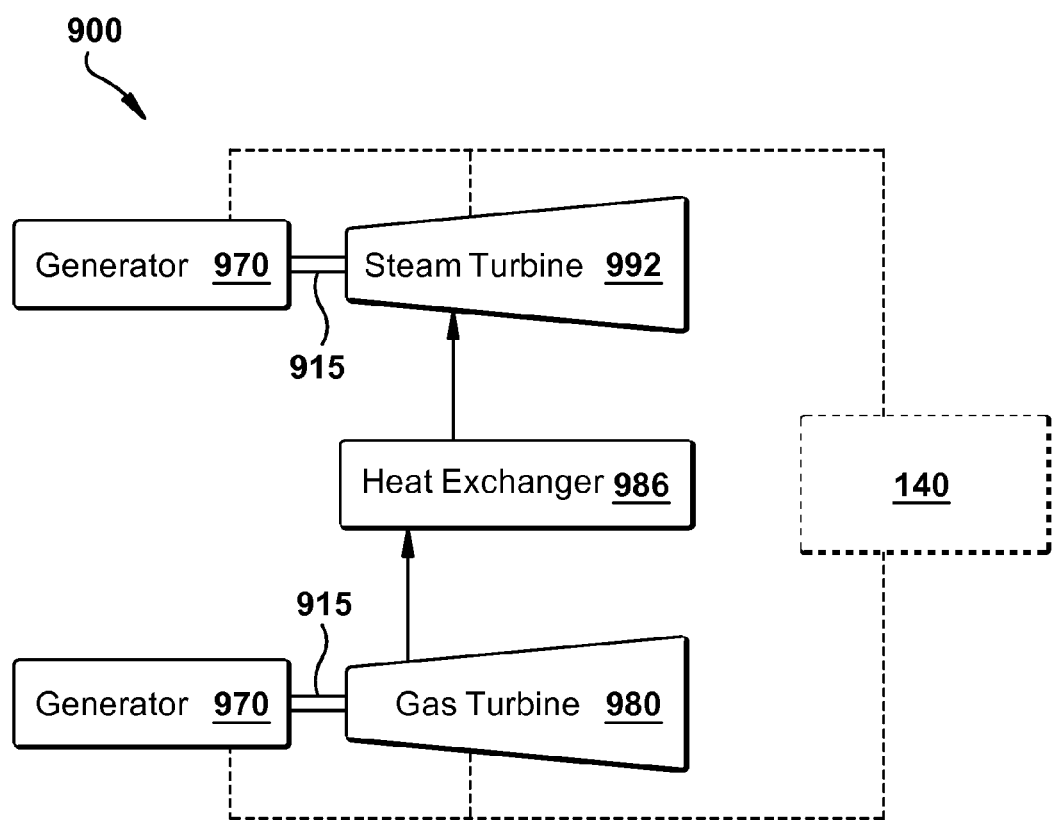
FIG. 13 shows a schematic block diagram illustrating portions of a combined cycle power plant system according to embodiments of the invention.
Figure 14:
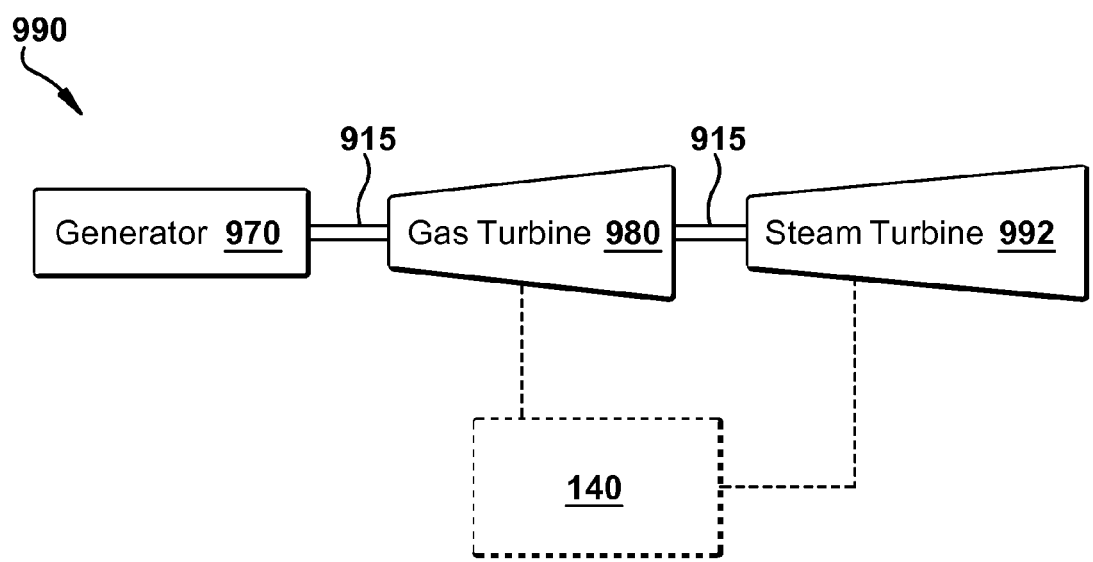
FIG. 14 shows a schematic block diagram illustrating portions of a single-shaft combined cycle power plant system according to embodiments of the invention.

Turning to FIG. 13, a schematic view of portions of a multi-shaft combined-cycle power plant 900 is shown. Combined-cycle power plant 900 may include, for example, a gas turbine 942 operably connected to a generator 944. Generator 944 and gas turbine 942 may be mechanically coupled by a shaft 911, which may transfer energy between a drive shaft (not shown) of gas turbine 942 and generator 944. A steam turbine 948 may be connected to support bar 140 of FIG. 4 or other embodiments described herein. Also shown in FIG. 13 is a heat exchanger 946 operably connected to gas turbine 942 and steam turbine 948. Heat exchanger 946 may be fluidly connected to both gas turbine 942 and steam turbine 948 via conventional conduits (numbering omitted). Heat exchanger 946 may be a conventional heat recovery steam generator (HRSG), such as those used in conventional combined-cycle power systems. As is known in the art of power generation, HRSG 946 may use hot exhaust from gas turbine 942, combined with a water supply, to create steam which is fed to steam turbine 948. Steam turbine 948 may optionally be coupled to a second generator system 944 (via a second shaft 911). It is understood that generators 944 and shafts 911 may be of any size or type known in the art and may differ depending upon their application or the system to which they are connected. Common numbering of the generators and shafts is for clarity and does not necessarily suggest these generators or shafts are identical. Generator system 944 and second shaft 911 may operate substantially similarly to generator system 944 and shaft 911 described above. Steam turbine 948 may be connected to device 140 of FIG. 4 or other embodiments described herein. In another embodiment, shown in FIG. 14, a single-shaft combined-cycle power plant 990 may include a single generator 944 coupled to both gas turbine 942 and steam turbine 946 via a single shaft 911. Gas turbine 942 and/or steam turbine 948 may be connected to support bar 140 of FIG. 4 or other embodiments described herein.

The system of the present disclosure is not limited to any one particular machine, driven machine, turbine, fan, blower, compressor, power generation system or other system, and may be used with other power generation systems and/or systems (e.g., combined-cycle, simple-cycle, nuclear reactor, etc.). Additionally, the systems and devices of the present invention may be used with other systems not described herein that may benefit from the accessibility, versatility, and functionality of the systems and devices described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A steam turbine support bar comprising:
   a body portion configured to be transversely disposed across a centerline of a steam turbine, the body portion configured to connect to a steam turbine component;
   a first flange extending from the body portion and configured to contact a steam turbine casing, wherein the steam turbine support bar is configured to non-affixedly join the steam turbine casing to the steam turbine component; and a second flange configured to be completely disposed above the centerline and proximate the first flange and extending from the body portion in a direction opposite the first flange, the second flange configured to contact the steam turbine component, wherein the second flange includes a hook portion configured to matingly engage with a portion of steam turbine component.

2. The steam turbine support bar of claim 1, wherein the first flange is configured to complement a set of shims disposed between the steam turbine casing and the first flange, the set of shims disposed on a horizontal joint of the steam turbine.

3. The steam turbine support bar of claim 1, wherein the first flange is configured to be completely disposed above the centerline.

4. The steam turbine support bar of claim 1, wherein the body portion is configured to connect to the steam turbine component beneath the centerline.

5. The steam turbine support bar of claim 1, wherein the body portion defines a set of apertures configured to complement a set of connectors.

6. The steam turbine support bar of claim 5, wherein the set of apertures include a countersink.

7. The steam turbine support bar of claim 1, further comprising a third flange extending from the body portion beneath the centerline, the third flange configured to connect to the steam turbine component.

8. The steam turbine support bar of claim 7, wherein the body portion defines a set of apertures configured to complement a set of connectors and at least one of the set of apertures is defined through the third flange, and wherein the set of apertures includes two apertures located beneath the centerline.

9. A steam turbine nozzle support assembly comprising:
a steam turbine casing;
a semi-annular diaphragm segment at least partially housed within the steam turbine casing; and
a steam turbine support bar disposed between the steam turbine casing and the semi-annular diaphragm segment, the steam turbine support bar connected to the semi-annular diaphragm segment and including:
a body portion configured to be transversely disposed across a centerline of a steam turbine, the body portion configured to connect to the semi-annular diaphragm segment;
a first flange extending from the body portion and contacting the steam turbine casing above the centerline, wherein the steam turbine support bar is configured to non-affixedly join the steam turbine casing to the steam turbine component; and
a second flange completely disposed above the centerline, proximate the first flange and extending from the body portion in a direction opposite the first flange, the second flange configured to contact the semi-annular diaphragm segment.

10. The steam turbine nozzle support assembly of claim 9, wherein the first flange is configured to complement a set of shims disposed between the steam turbine casing and the first flange, the set of shims disposed on a horizontal joint of the steam turbine.

11. The steam turbine nozzle support assembly of claim 9, wherein the body portion is connected to steam turbine component beneath the centerline.

12. The steam turbine nozzle support assembly of claim 9, wherein the body portion defines a set of apertures configured to complement a set of connectors.

13. The steam turbine nozzle support assembly of claim 12, wherein the set of apertures include a countersink.

14. The steam turbine nozzle support assembly of claim 9, further comprising a third flange extending from the body portion beneath the centerline, the third flange configured to connect to the steam turbine component.

15. The steam turbine nozzle support assembly of claim 14, wherein the body portion defines a set of apertures configured to complement a set of connectors and at least one of the set of apertures is defined through the third flange.

16. The steam turbine nozzle support assembly of claim 9, wherein the second flange includes a hook portion configured to matingly engage with a portion of the semi-annular diaphragm segment.

17. The steam turbine nozzle support assembly of claim 16, further comprising a fillet disposed between the body portion and the first flange.

18. A steam turbine apparatus comprising:
a casing having a horizontal joint surface;
a rotor within the casing; and
a steam turbine nozzle support assembly including:
a semi-annular diaphragm segment at least partially housed within the casing; and
a support bar connected to the semi-annular diaphragm segment and in contact with the casing, the support bar including:
a body portion configured to be transversely disposed across a centerline of a steam turbine, the body portion configured to connect to the semi-annular diaphragm segment beneath the centerline;
a first flange extending from the body portion and contacting the horizontal joint surface, wherein the steam turbine support bar is configured to non-affixedly join the steam turbine casing to the steam turbine component; and
a second flange completely disposed above the centerline, proximate the first flange and extending from the body portion in a direction opposite the first flange, the second flange configured to contact the semi-annular diaphragm segment.

19. The steam turbine apparatus of claim 18, wherein the first flange is configured to be disposed above the centerline and the body portion is connected to the semi-annular diaphragm beneath the centerline.

* * * * *